US012732003B2

(12) United States Patent
Brown

(10) Patent No.: US 12,732,003 B2
(45) Date of Patent: Sep. 8, 2026

(54) ELECTRIC BICYCLE CHARGER ASSEMBLY

(71) Applicant: Anthony Brown, San Francisco, CA (US)

(72) Inventor: Anthony Brown, San Francisco, CA (US)

( * ) Notice: Subject to any disclaimer, the term of this patent is extended or adjusted under 35 U.S.C. 154(b) by 819 days.

(21) Appl. No.: 18/128,926

(22) Filed: Mar. 30, 2023

(65) Prior Publication Data

US 2024/0333019 A1 Oct. 3, 2024

(51) Int. Cl.

| | |
|---|---|
| ***H02J 7/00*** | (2026.01) |
| ***B60D 1/62*** | (2006.01) |
| ***B60T 1/06*** | (2006.01) |
| ***B60T 11/04*** | (2006.01) |
| ***B62J 45/00*** | (2020.01) |
| ***B62K 27/00*** | (2006.01) |
| ***B62K 27/12*** | (2006.01) |
| ***H02J 7/14*** | (2006.01) |
| ***H02J 7/70*** | (2026.01) |
| *B60D 1/00* | (2006.01) |

(52) U.S. Cl.

CPC .............. *H02J 7/1407* (2013.01); *B60D 1/62* (2013.01); *B60T 1/06* (2013.01); *B60T 11/046* (2013.01); *B62J 45/00* (2020.02); *B62K 27/003* (2013.01); *B62K 27/12* (2013.01); *H02J 7/70* (2026.01); *B60D 2001/003* (2013.01)

(58) Field of Classification Search

CPC .. H02J 7/1407; H02J 7/70; B60D 1/62; B60D 2001/003; B60T 1/06; B60T 11/046; B62J 45/00; B62K 27/003; B62K 27/12

USPC ............................ 320/103, 107, 109; 701/22

See application file for complete search history.

(56) References Cited

U.S. PATENT DOCUMENTS

| | | | | | |
|---|---|---|---|---|---|
| 6,390,215 | B1 | 5/2002 | Kodama | | |
| 9,321,357 | B2 | 4/2016 | Caldeira | | |
| D887,905 | S | 6/2020 | Fricke | | |
| 2002/0038730 | A1* | 4/2002 | Bidwell | B62M 7/16 | 180/15 |
| 2010/0065344 | A1* | 3/2010 | Collings, III | B60L 3/10 | 180/2.1 |
| 2010/0096197 | A1* | 4/2010 | Stoddart | B62M 7/16 | 280/481 |
| 2012/0202649 | A1* | 8/2012 | Huber | B62M 6/90 | 482/2 |
| 2013/0098816 | A1 | 4/2013 | Elfstrom | | |
| 2014/0285005 | A1 | 9/2014 | Casteel | | |
| 2015/0360745 | A1* | 12/2015 | Irwin | B62J 1/28 | 188/24.14 |

(Continued)

FOREIGN PATENT DOCUMENTS

| | | |
|---|---|---|
| WO | WO2019043205 | 3/2019 |

*Primary Examiner* — Zixuan Zhou

(57) ABSTRACT

An electric bicycle charger assembly includes a trailer that can be attached to a seat post of an electric bicycle thereby facilitating the electric bicycle to tow the trailer. A pair of wheels is each of the wheels is rotatably attached to the trailer and a pair of charging units is each integrated into a respective one of the wheels generate electricity when the trailer is being towed. Each of the charging units is electrically coupled to the electric bicycle for charging the electric bicycle. A braking system is integrated into the trailer and the braking system is in communication with a braking apparatus of the electric bicycle thereby assisting with slowing and stopping.

19 Claims, 14 Drawing Sheets

(56) References Cited

U.S. PATENT DOCUMENTS

2016/0325640 A1* 11/2016 Craven .................... B62M 6/45
2020/0189684 A1 6/2020 Engel

* cited by examiner

ELECTRIC BICYCLE CHARGER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to charger devices and more particularly pertains to a new charger device for charging an electric bicycle while the electric bicycle is being ridden. The device includes a trailer that can be towed by the electric bicycle and a pair of charging units that is each integrated into a respective one of a pair of wheels of the trailer. Each of the charging units generates electrical energy when the trailer is towed and each of the charging units is electrically coupled to the electric bicycle for charging the electric bicycle.

(2) Description of Related Art Including Information Disclosed Under 37 CFR 1.97 and 1.98

The prior art relates to charger devices including a variety of charging devices that each at least includes a trailer with a charging unit integrated into the trailer and an electric vehicle for towing the trailer thereby charging the electric vehicle and a trailer with an internal combustion engine for assisting with propelling a bicycle. In no instance does the prior art disclose a trailer that is towable with an electric bicycle and a pair of charging units integrated into the trailer which generate electrical energy when the trailer is towed for charging the electric bicycle.

BRIEF SUMMARY OF THE INVENTION

An embodiment of the disclosure meets the needs presented above by generally comprising a trailer that can be attached to a seat post of an electric bicycle thereby facilitating the electric bicycle to tow the trailer. A pair of wheels is each of the wheels is rotatably attached to the trailer and a pair of charging units is each integrated into a respective one of the wheels generate electricity when the trailer is being towed. Each of the charging units is electrically coupled to the electric bicycle for charging the electric bicycle. A braking system is integrated into the trailer and the braking system is in communication with a braking apparatus of the electric bicycle thereby assisting with slowing and stopping.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figures 1, 2:
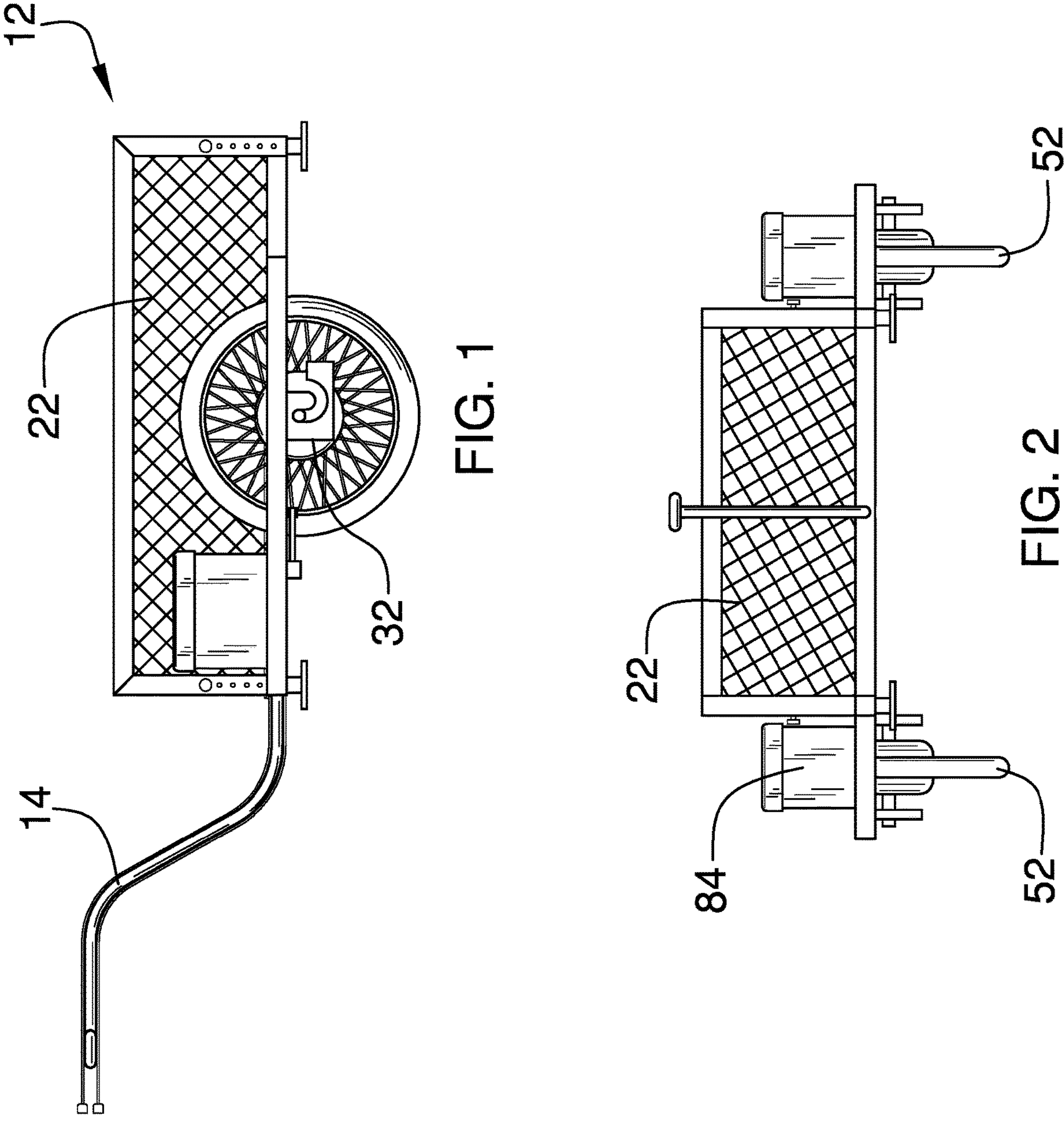
FIG. 1 is a left side view of an electric bicycle charger assembly according to an embodiment of the disclosure.
FIG. 2 is a front view of an embodiment of the disclosure.
Figure 3:
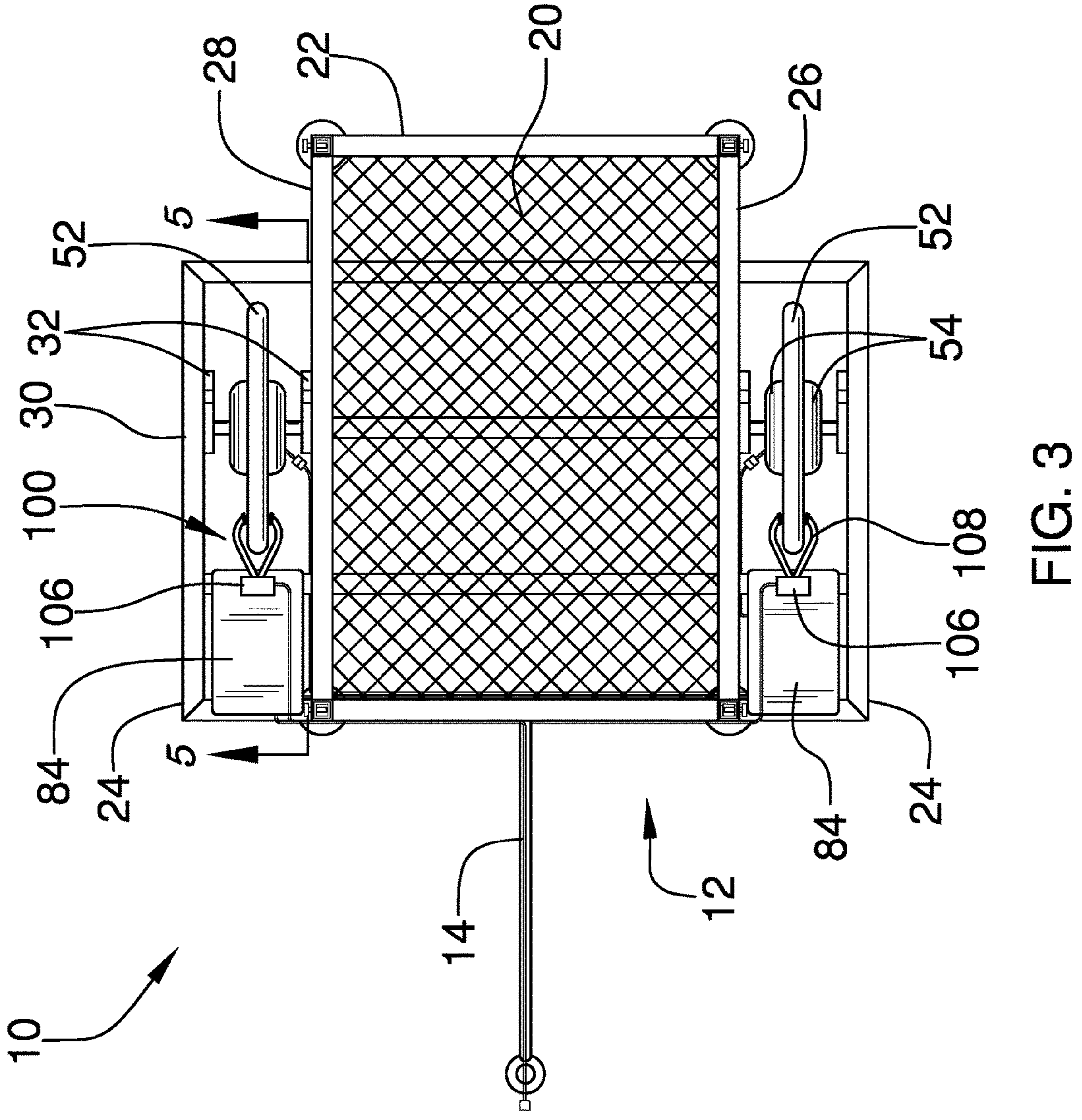
FIG. 3 is a top view of an embodiment of the disclosure.
Figure 4:
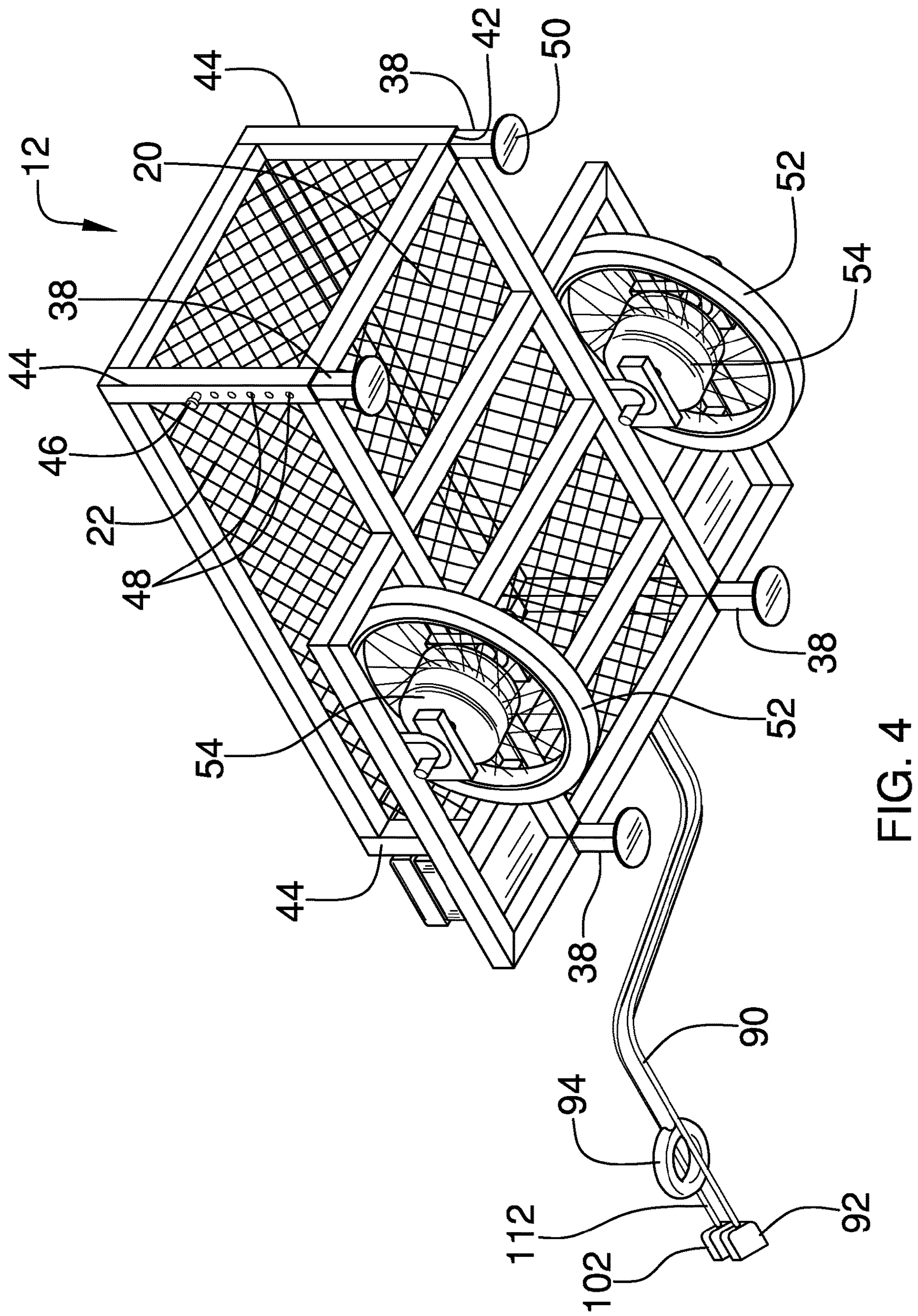
FIG. 4 is a bottom perspective view of an embodiment of the disclosure.
Figure 5:
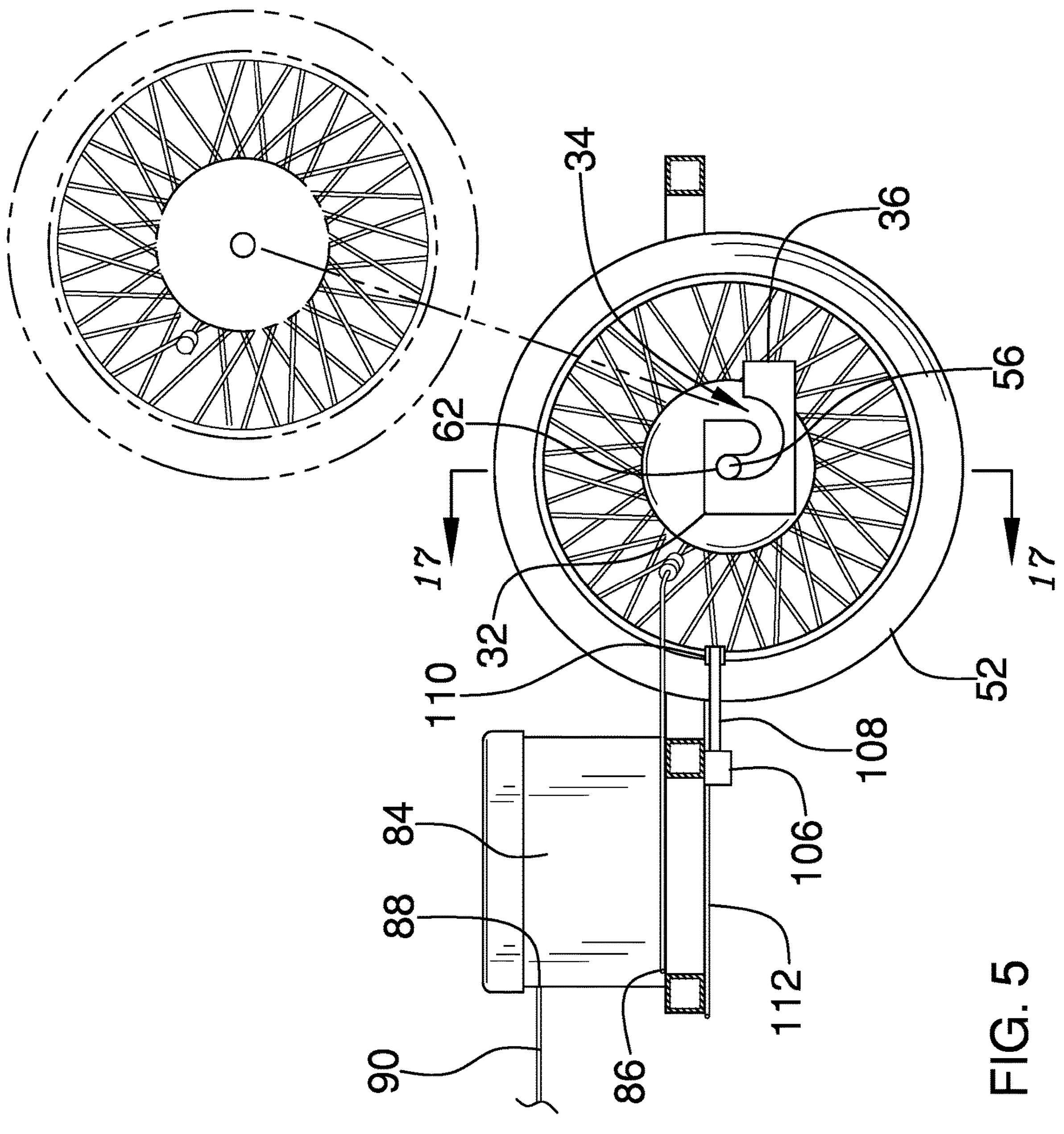
FIG. 5 is a cross sectional view taken along line 5-5 of FIG. 3 of an embodiment of the disclosure.
Figure 6:
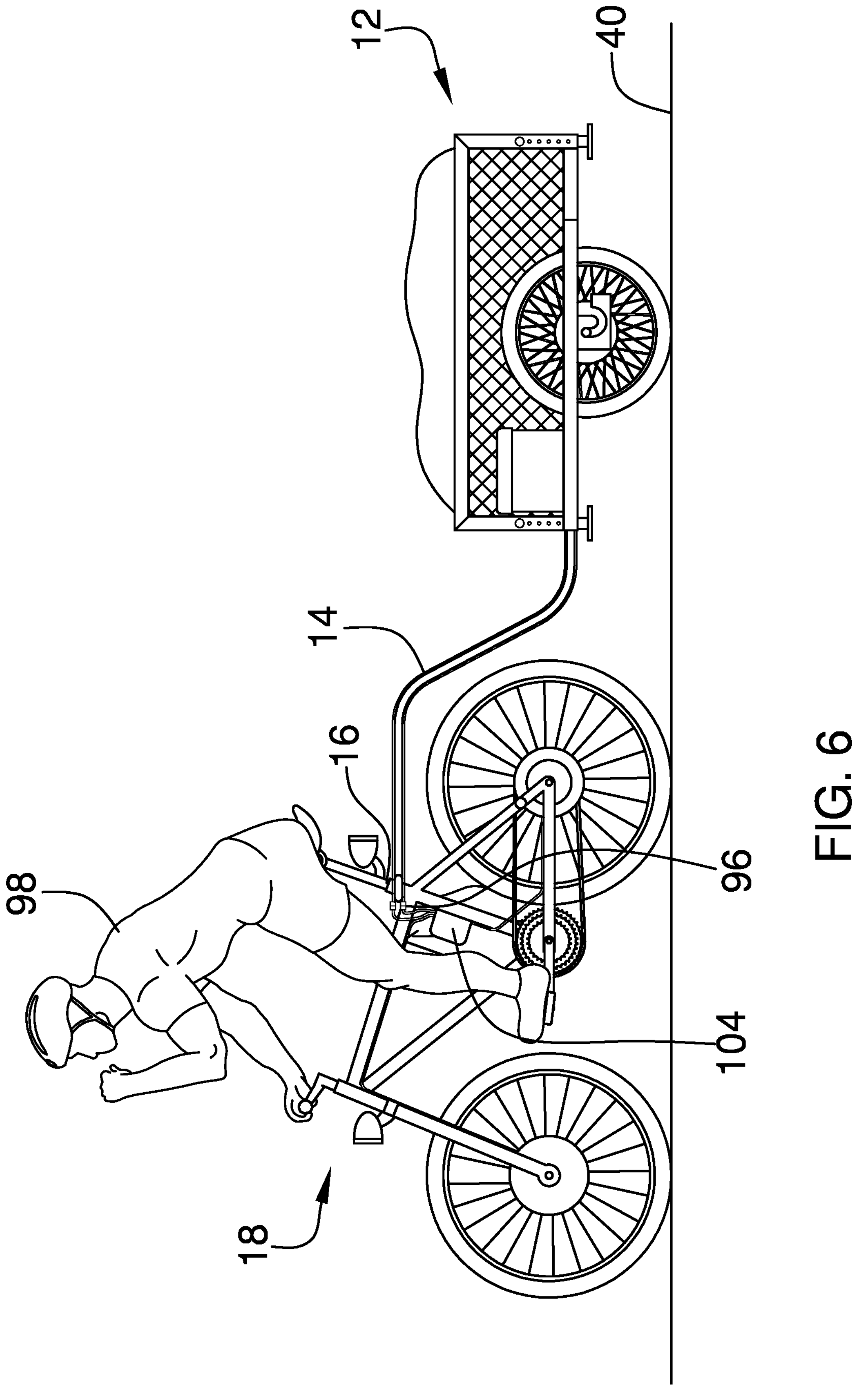
FIG. 6 is a perspective in-use view of an embodiment of the disclosure.
Figures 7, 8:
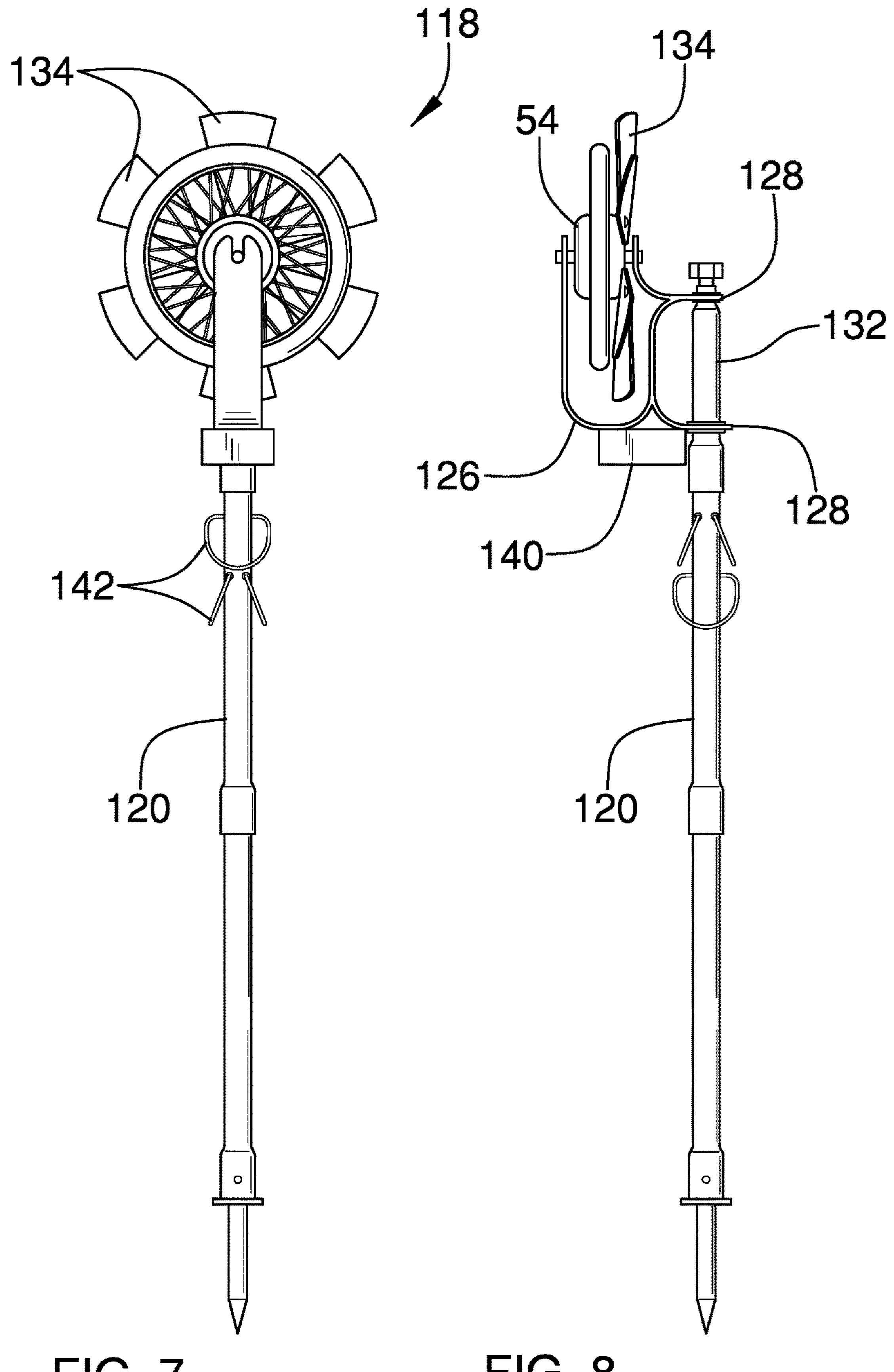
FIG. 7 is a front view of an alternative embodiment of the disclosure.
FIG. 8 is a left side view of an alternative embodiment of the disclosure.
Figures 9, 10:
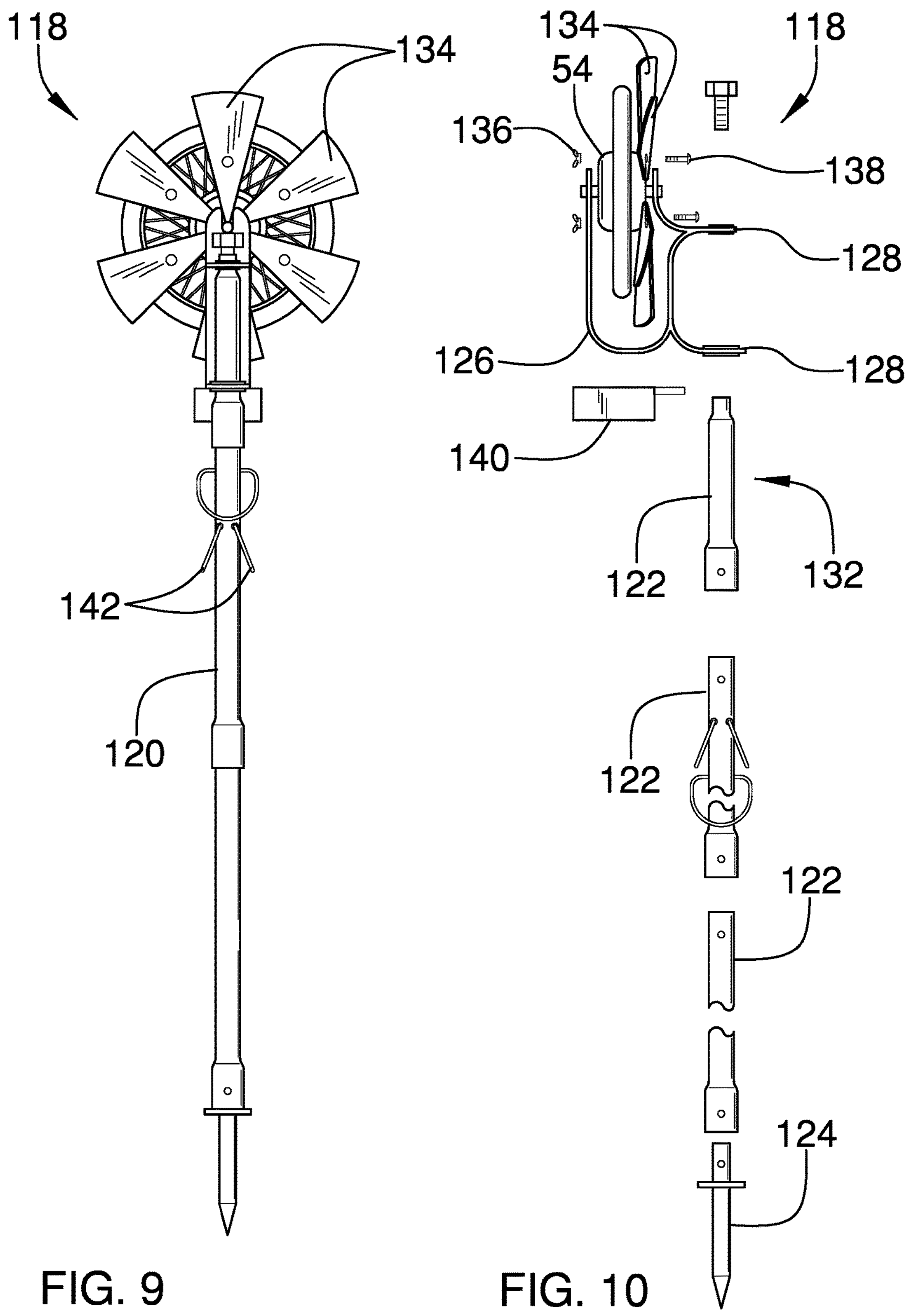
FIG. 9 is a back view of an alternative embodiment of the disclosure.
FIG. 10 is an exploded perspective view of an alternative embodiment of the disclosure.
Figure 11:
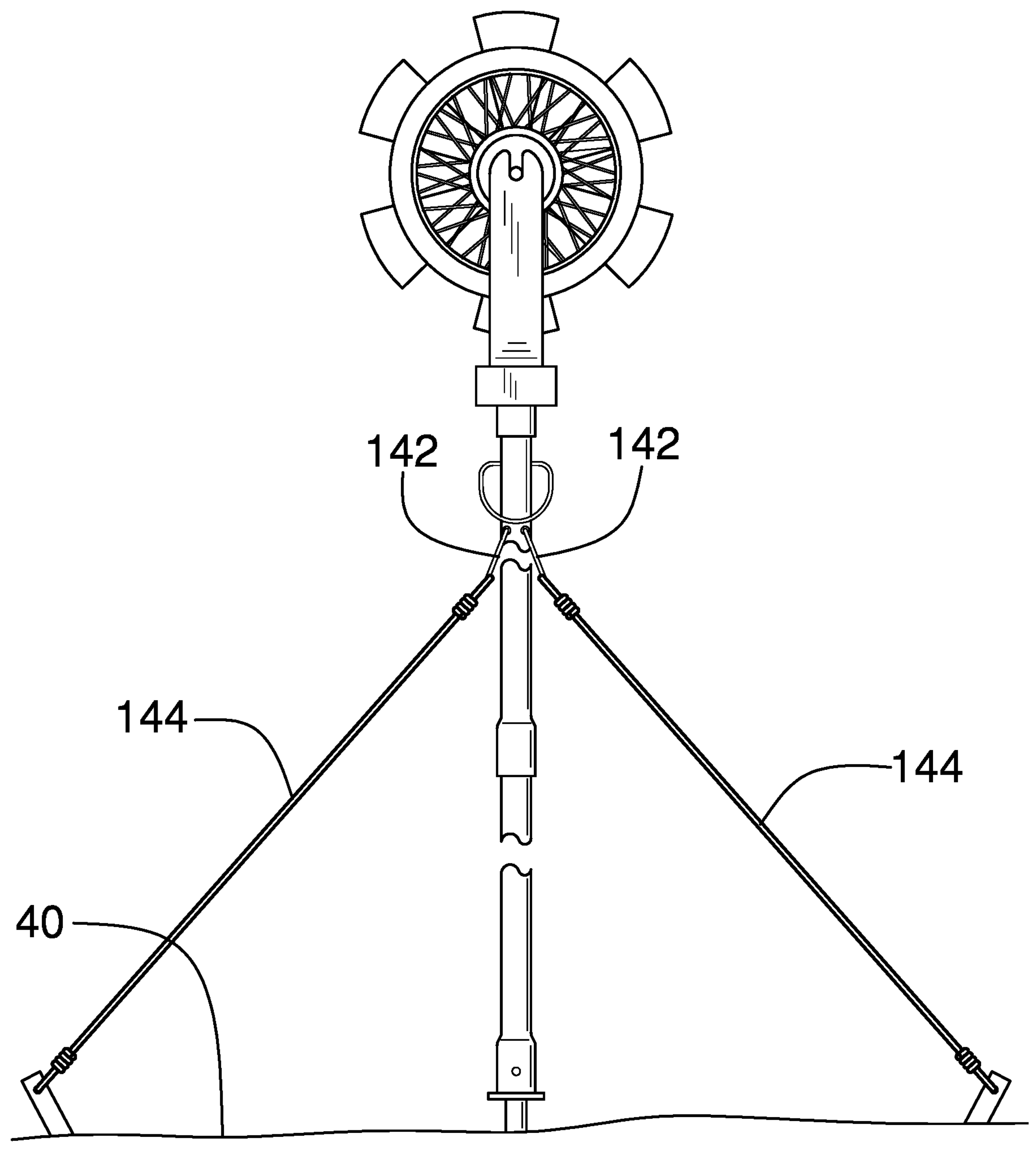
FIG. 11 is a perspective in-use view of an alternative embodiment of the disclosure.

With reference now to the drawings, and in particular to FIGS. 1 through 17 thereof, a new charger device embodying the principles and concepts of an embodiment of the disclosure and generally designated by the reference numeral 10 will be described.

As best illustrated in FIGS. 1 through 17, the electric bicycle charger assembly generally comprises a trailer 12 that has a gooseneck hitch 14 that can be attached to a seat post 16 of an electric bicycle 18 thereby facilitating the electric bicycle 18 to tow the trailer 12. The electric bicycle 18 may be an electric bicycle of any conventional design, including but not being limited to those that have pedals which can be pedaled by a rider. The trailer 12 has a lower wall 20 and a perimeter wall 22 extending upwardly from the lower wall 20. Additionally, the trailer 12 has a pair of wheel brackets 24 that each extends laterally away from a respective one of a first lateral side 26 and a second lateral side 28 of the perimeter wall 22; each of the wheel brackets 24 is aligned with the lower wall 20. Each of the wheel brackets 24 includes an outer member 30 that is spaced from and is oriented parallel with the respective first lateral side 26 and the second lateral side of the perimeter wall 22. Each of the wheel brackets 24 includes a pair of wheel mounts 32 which each extends downwardly from the outer member 30. Each of the wheel mounts 32 has a channel 34 which extends inwardly on a rear edge 36 of a respective wheel mount 32 which curves upwardly toward the outer member 30 such that the channel 34 in each of the wheel mounts 32 has a J-shape.

A plurality of stabilizers 38 is provided and each of the stabilizers 38 is slidably integrated into the trailer 12. Each of the plurality of stabilizers 38 is deployable to extend downwardly from the trailer 12 to abut the ground 40 for stabilizing the trailer 12. Each of the plurality of stabilizers 38 extends into a bottom end 42 of a respective one of a plurality of corner posts 44 of the perimeter wall 22 of the trailer 12. Additionally, each of the plurality of stabilizers 38 has a lock 46 which releasably engages a respective one of a plurality of engagement points 48 integrated into the respective corner post 44 for retaining the plurality of stabilizers 38 at a selected length of extension. Each of the plurality of stabilizers 38 has a foot 50 which abuts the ground 40 when the stabilizers 38 are deployed.

A pair of wheels 52 is each rotatably attached to the trailer 12 to roll along ground when the trailer 12 is being towed. A pair of charging units 54 is each integrated into a respective one of the wheels 52 such that each of the charging units 54 rotates when the respective wheel 52 rotates. In this way each of the charging units 54 generates electricity when the trailer 12 is being towed. Each of the charging units 54 comprises an axle 56 which extends through a hub of the respective wheel 52 and the axle 56 has a first end 58 and a second end 60. The axle 56 extends into the channel 34 in each of the wheel mounts 32 associated with a respective one of the wheel brackets 24 having the axle 56 resting against a terminal end 62 of the channel 34 in each of the wheel mounts 32. In this way the respective wheel 52 is positioned between the outer member 30 of the respective wheel bracket 24 and the perimeter wall 22 of the trailer 12.

Each of the charging unit includes a pair of nuts 64 and each of the nuts 64 is threadable onto a respective one of the first end 58 and the second end 60 of the axle 56 for tightening against a respective one of the wheel mounts 32 thereby attaching the axle 56 to the wheel mounts 32. Each of the charging units 54 includes a bearing 66 that is positioned around the axle 56. The bearing 66 engages the hub 68 of the respective wheel 52 thereby enhancing rotation of the wheel 52 around the axle 56. Additionally, the bearing 66 is centrally positioned between the first end 58 and the second end 60 of the axle 56.

Each of the charging units 54 includes a pair of bowls 70 that each of the bowls has an outer wall 72 and a perimeter wall 74 extending away from the outer wall 72 and the axle 56 extends through the outer wall 72 of each of the bowls 70. Each of the pair of bowls 70 is oriented on the axle 56 such that a distal edge 76 of the perimeter wall of each of the bowls 70 is directed toward the wheel 52. Each of the charging units 54 includes a pair of generators 78 and each of the generators 78 is positioned inside a respective one of the bowls 70. Each of the generators 78 includes a winding section 80 and a magnet section 82. The winding section 80 of each of the generators 78 is attached to the perimeter wall 22 of the respective bowl 70 having the axle 56 extending through the winding section 80 of each of the generators 78. The magnet section 82 each of the generators 78 is attached to the wheel 52 such that the magnet section 82 of each of generators 78 is rotated around the winding section 80 of a respective generator 78 when the wheel 52 rotates. In this way each of the generators 78 can generate electrical energy when the respective wheel 52 rotates.

Each of the charging units 54 includes a rechargeable battery 84 that is secured to the trailer 12 and the rechargeable battery 84 has an input 86 and an output 88. The input is electrically coupled to each of the pair of generators 78 such that the pair of generators 78 charges the rechargeable battery 84. In this way the rechargeable battery is charged when the trailer 12 is being towed. The rechargeable battery 84 may comprise a lithium ion battery or other type of chemical battery with a charge capacity of at least 250.0 ampere hours.

The pair of charging units 54 includes a conductor 90 that is electrically coupled to the output of the rechargeable battery 84 associated with each of the charging units 54. The conductor 90 is routed along the gooseneck hitch 14 such that a connector 92 on the conductor 90 is positioned adjacent to a coupling point 94 on the gooseneck hitch 14. In this way the connector 92 can be electrically coupled to a charging port 96 on the electric bicycle 18 thereby facilitating the rechargeable battery 84 to charge the electric bicycle 18. Furthermore, the charging units 54 facilitate the electric bicycle 18 to have an operational range that is limited only by the physical limitations of a rider 98.

A braking system 100 is integrated into the trailer 12 and the braking system 100 has a communication port 102 which can be placed in communication with a braking apparatus 104 of the electric bicycle 18. The braking system 100 is actuated into a braking condition when the communication port 102 receives a braking command. In this way the braking system 100 on the trailer 12 is actuated when the braking apparatus on the electric bicycle 18 is actuated thereby assisting with slowing and stopping. The braking system 100 includes a pair of brakes 106 that is each associated with a respective one of the wheels 52.

Each of the brakes 106 comprises a brake caliper 108 that is attached to a respective one of the wheel brackets 24. The brake caliper 108 has a pair of grips 110 which each extend beyond the respective wheel 52 on opposing sides of the respective wheel 52. The grips 110 are urged toward each other when the brake caliper 108 is actuated. Subsequently, each of the grips 110 compresses against the respective wheel 52 when the brake caliper 108 is actuated for slowing a rotation of the respective wheel 52. Each of the grips 110 may include a foot comprised of a compressible material such as rubber or the like for frictionally engaging the respective wheel 52. The braking system includes a brake cable 112 that is in communication with the brake caliper 108 associated with each of the brakes 106. The brake cable

112 is routed along the gooseneck hitch 14 and the brake cable 112 includes the communication port 114 which is positioned adjacent the coupling point 94 on the gooseneck trailer 12. In this way the communication port 114 on the brake cable 112 can be coupled to a brake cable 116 of the braking apparatus 104 on the electric bicycle 18. Furthermore, the brake cable 112 may comprise a data cable or other type of cable which is comprised of electrical conductors.

Figure 12:
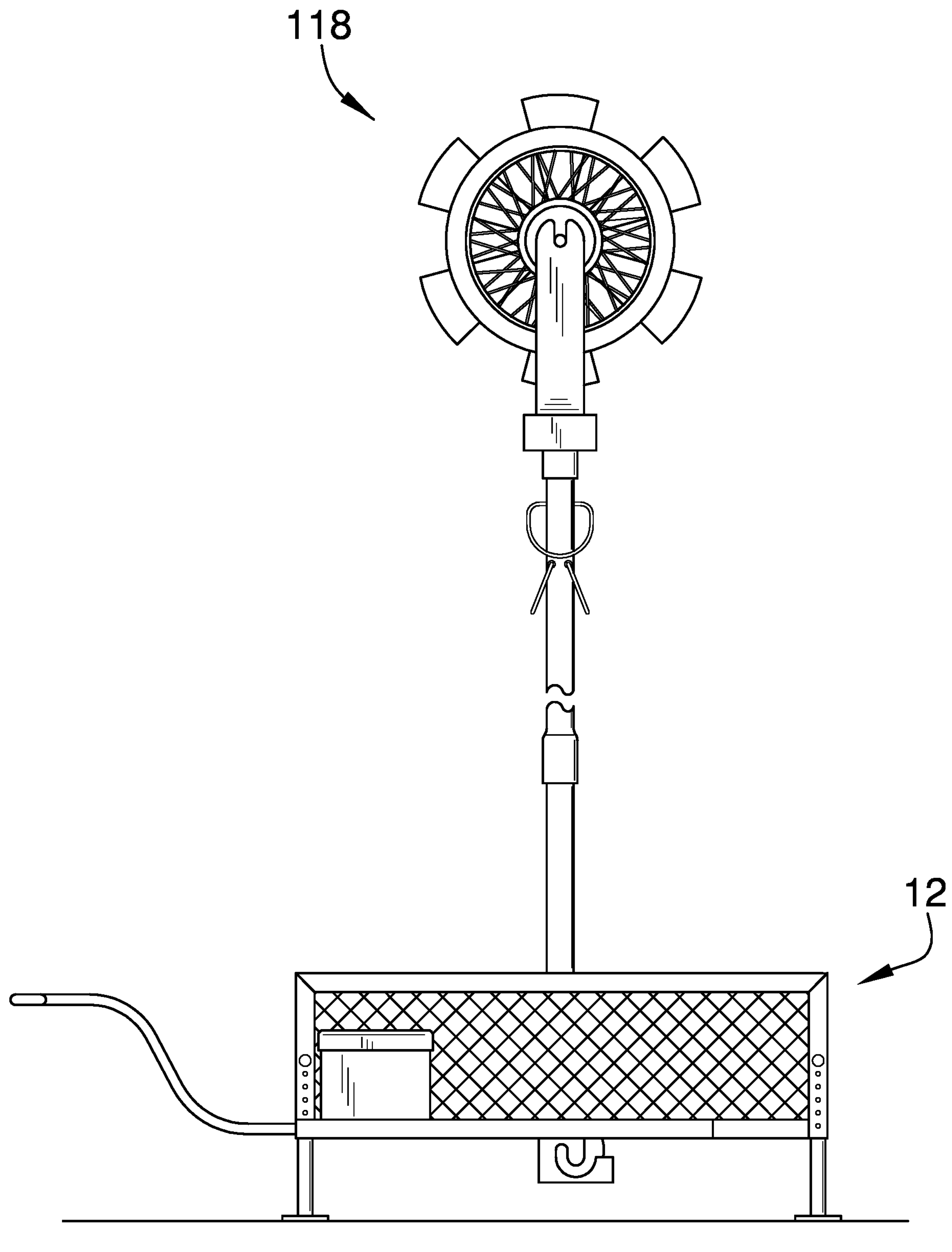
FIG. 12 is a front in-use view of an alternative embodiment of the disclosure.

In an alternative embodiment 118 shown in FIGS. 7 through 12, a modular pole 120 is provided which comprises plurality of attachable sections 122. A lowermost one of the attachable sections 124 tapers to a point to penetrate the ground 40 having the modular pole 120 being vertically oriented. A generator bracket 126 is included which has a pair of coupling points 128 and a cradle 130. Each of the coupling points 128 pivotally engages a topmost one of the attachable sections 132 of the modular pole 120 and a respective one of the charging units 54 is attachable to the cradle 130. The generator bracket 126 is elevated when the modular pole 120 is vertically oriented such that the respective charging unit 54 is exposed to wind. As is shown in FIG. 12, the modular pole 120 can be mounted to the trailer 12 to elevate the generator bracket 126 over the trailer 12.

Included in the alternative embodiment 118 is a plurality of fan blades 134 and each of the plurality of fan blades 134 is attachable to the respective charging unit 54. In this way each of the plurality of fan blades 134 is exposed to wind thereby facilitating the plurality of fan blades 134 to rotate the respective charging unit 54 for converting wind energy into electrical energy. As is most clearly shown in FIG. 10, a plurality of nuts and bolts 138 may be provided for attaching the plurality of fan blades 134 to a respective one of the bowls 70 associated with the respective charging unit 54.

Figure 16:
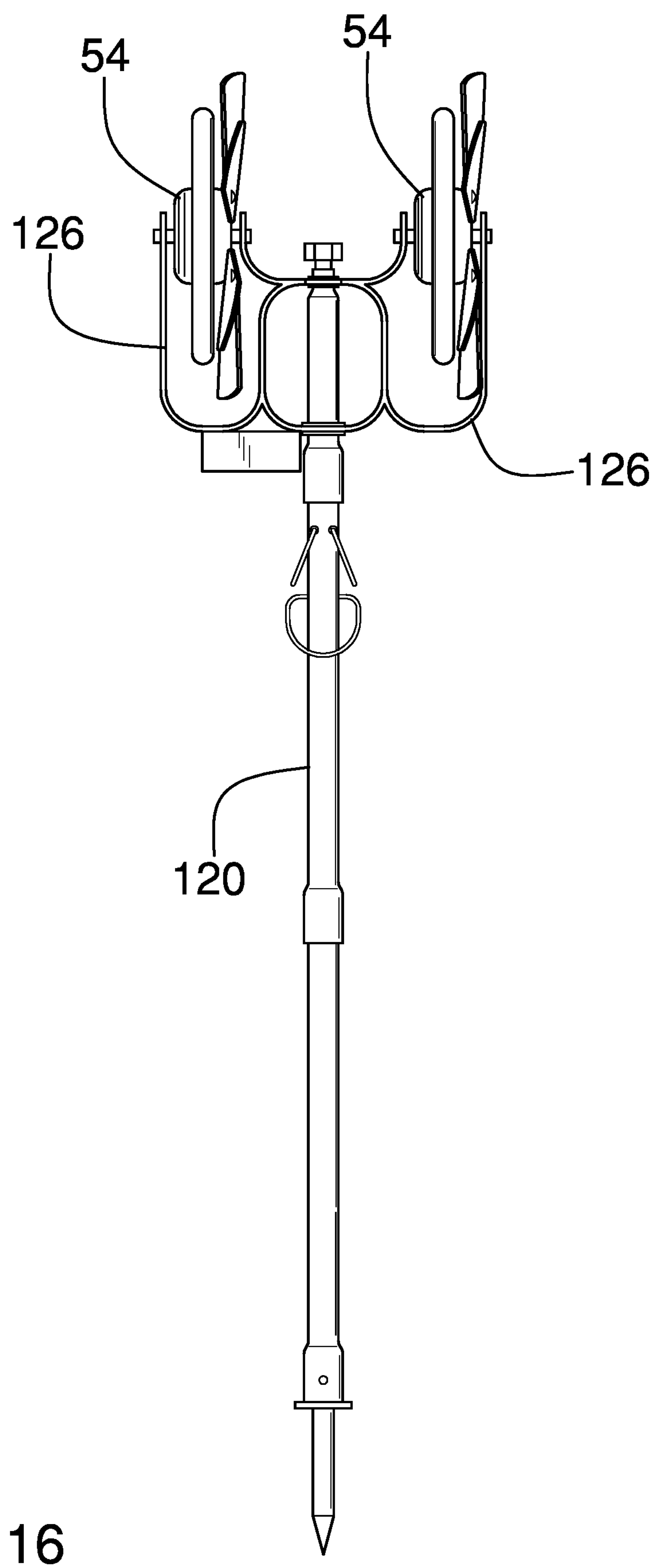
FIG. 16 is a perspective view of an alternative embodiment of the disclosure.
Figure 17:
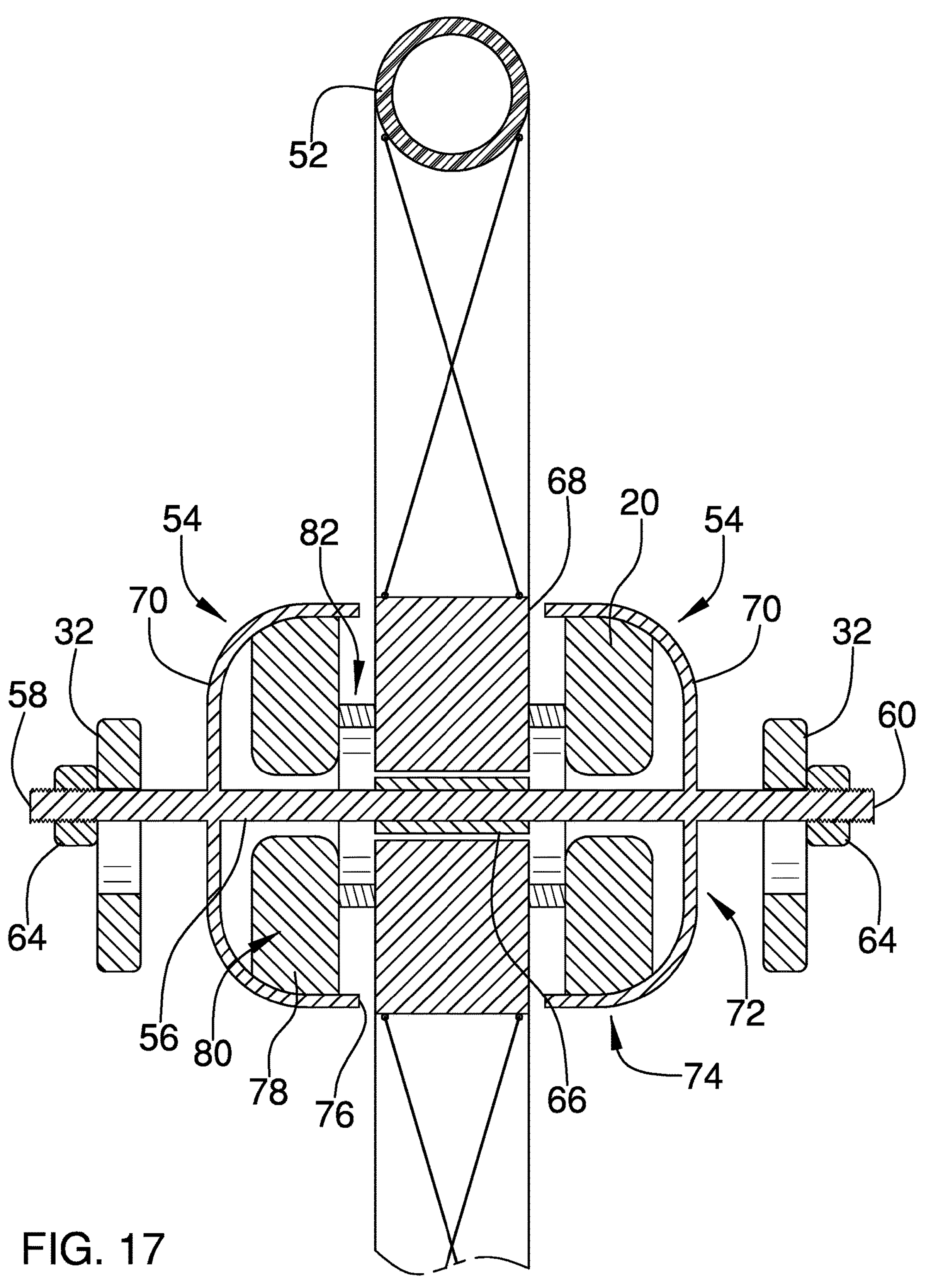
FIG. 17 is a cross sectional view taken along line 17-17 of FIG. 5 of an embodiment of the disclosure.

The alternative embodiment 118 includes a rechargeable battery 140 that is disposed on the topmost attachable section 132 of the modular pole 120. The rechargeable battery 140 associated with the modular pole 120 is electrically coupled to the generator bracket 126 such that the rechargeable battery 140 associated with the modular pole 120 is charged with wind energy. In this way the rechargeable battery 140 associated with the modular pole 120 can serve as an emergency backup for charging the electric bicycle 18. Continuing in the alternative embodiment 188, a plurality of tie down loops 142 is each attached to a respective one of the attachable sections 122 of the modular pole 120. In this way each of the plurality of tie down loops 142 can be attached to a tie down line 144 for retaining the modular pole 120 in a vertical orientation. As is shown in FIG. 16, a pair of the generator brackets 126 may each be attached to the modular pole 120 and each of the pair of charging units 54 may be attached to a respective one of the pair of generator brackets 126.

Figure 13:
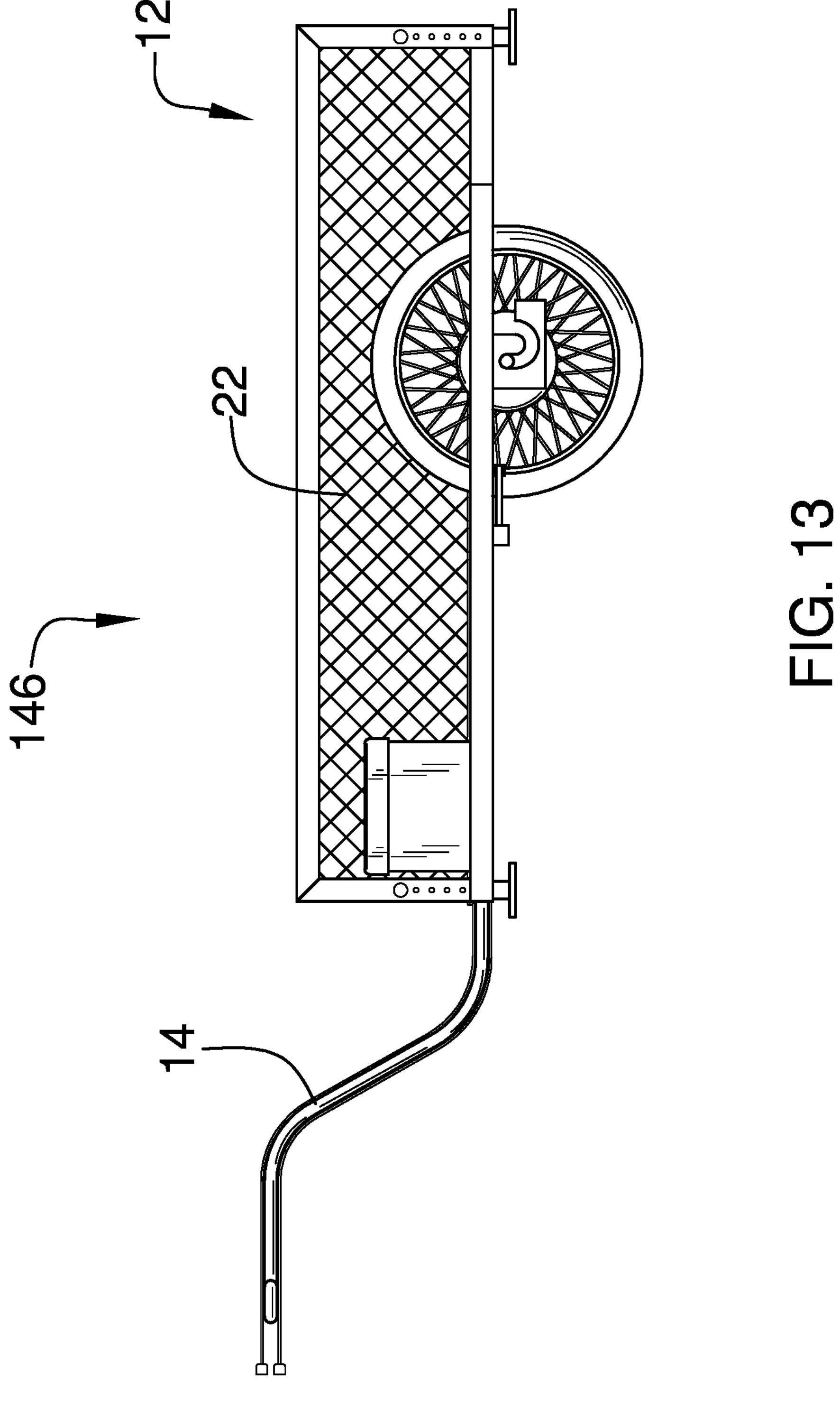
FIG. 13 is a left side view of an alternative embodiment of the disclosure.
Figure 14:
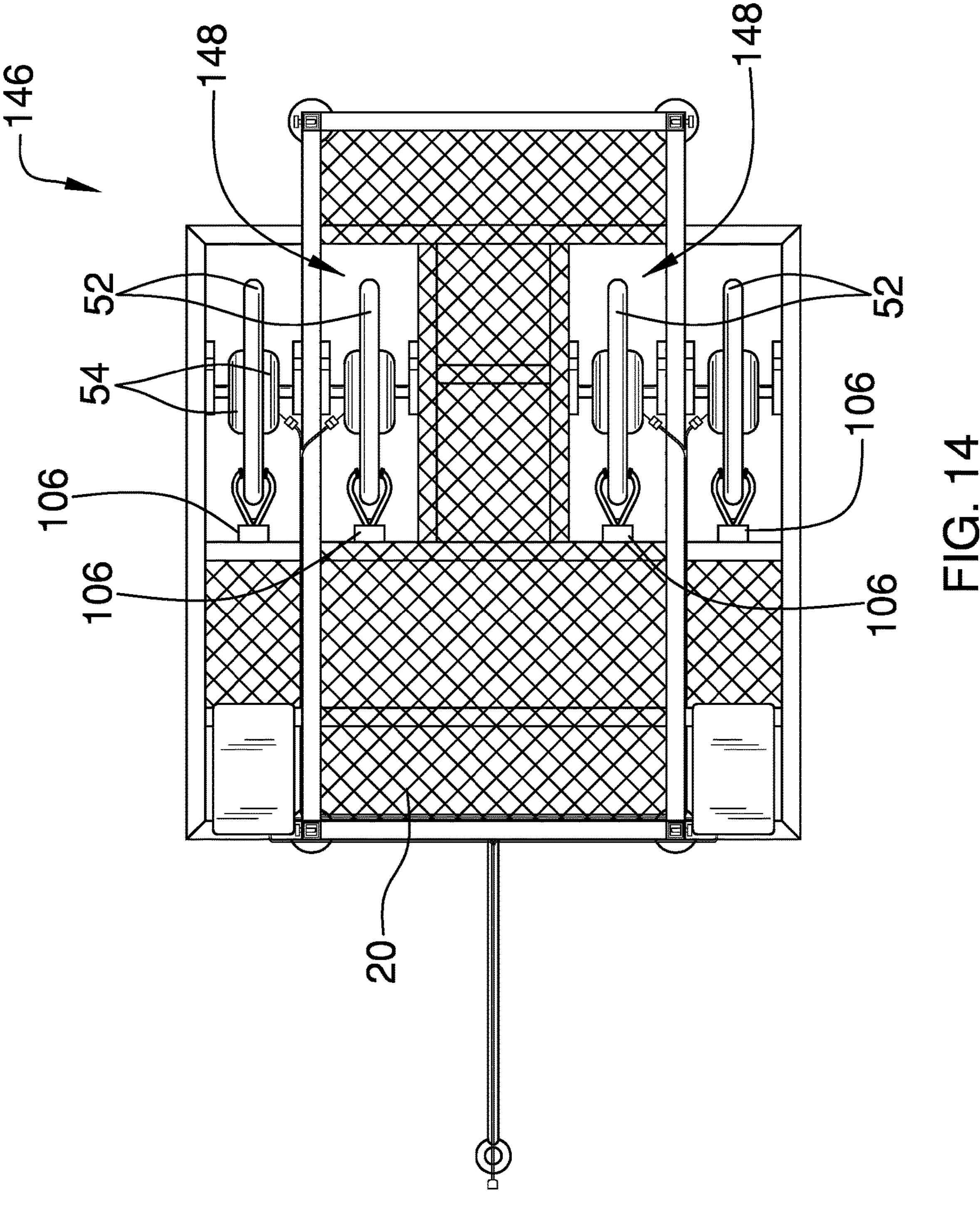
FIG. 14 is a top view of an alternative embodiment of the disclosure.
Figure 15:
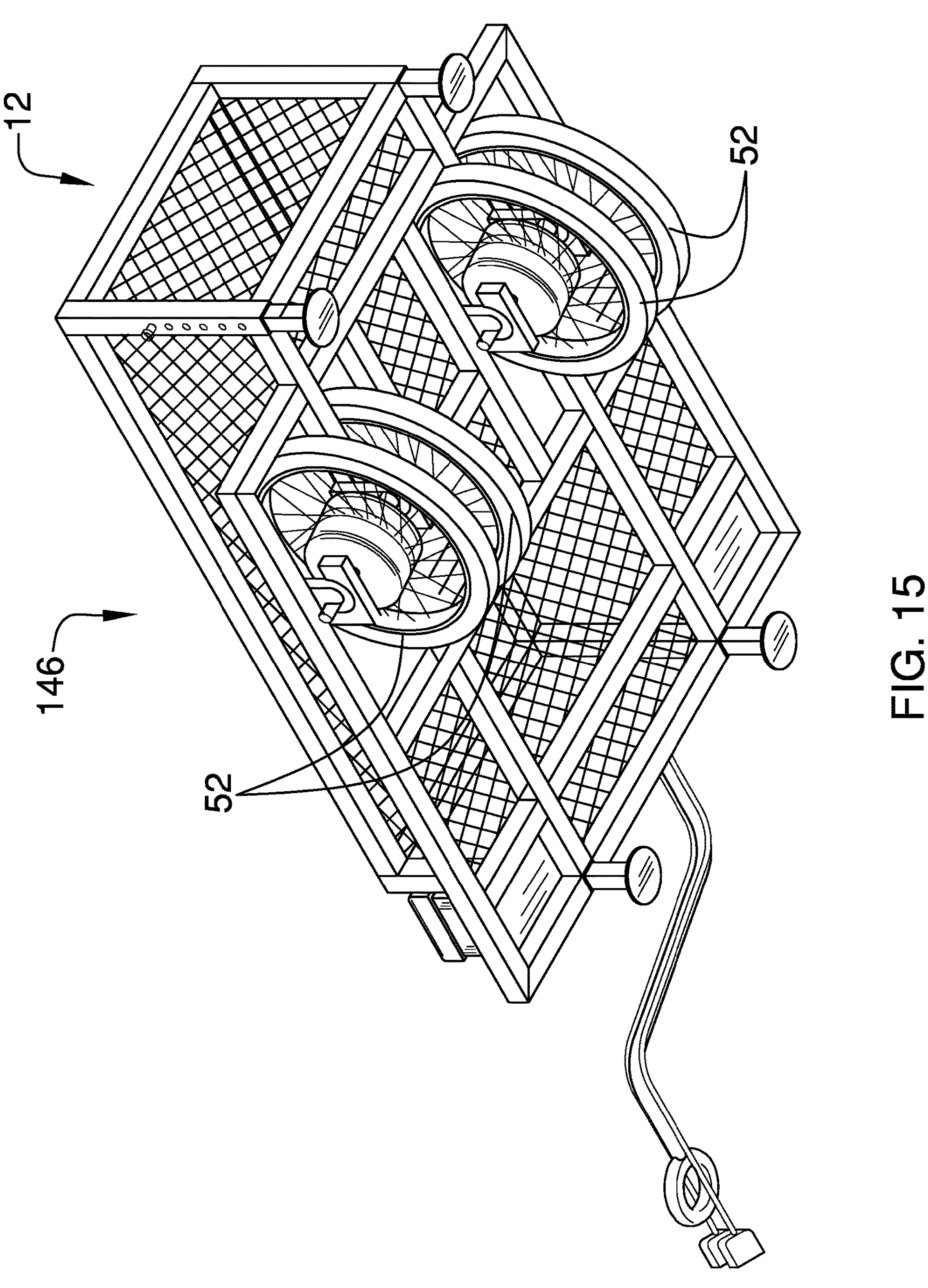
FIG. 15 is a bottom perspective view of an alternative embodiment of the disclosure.

In an alternative embodiment 146 shown in FIGS. 13 through 15, the trailer 12 is substantially elongated to increase the load capacity of the trailer 12. Additionally, the lower wall 20 of the trailer 12 has a pair of wheel openings 148 each extending through the lower wall 20 and each of the wheel openings 148 is positioned adjacent to a respective one of the wheel brackets 24. An additional pair of wheels 52 is each positioned in a respective one of the wheel openings 148 in the lower wall 20 of the trailer 12. An additional pair of charging units 54 is each integrated into a respective one of the additional pair of wheels 52. Each of the pair of additional charging units 54 is electrically coupled to a respective one of the rechargeable batteries 84. Additionally, the braking system 100 on the trailer 12 includes an additional pair of brakes 106 that is each associated with a respective one of the additional pair of wheels 52.

In use, the coupling on the gooseneck hitch 14 is attached to the seat post 16 of the electric bicycle 18 to facilitate the electric bicycle 18 to tow the vehicle. In this way the rechargeable battery 84 associated with each of the charging units 54 is charged while the trailer 18 is being towed. The connector 92 on the conductor 90 is connected to the charging port 96 on the electric bicycle 12 and the communication port on the brake cable is attached to the brake cable 116 of the braking apparatus 106 of the electric bicycle 18. In this way the rechargeable battery 84 associated with each of the charging units 54 can continuously charge the electric bicycle 18 thereby extending the operational range of the electric bicycle 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electric bicycle charger assembly for generating electricity while being towed by an electric bicycle, said assembly comprising:

- a trailer having a gooseneck hitch wherein said gooseneck hitch is configured to be attached to a seat post of the electric bicycle thereby facilitating the electric bicycle to tow said trailer;
- a pair of wheels, each of said wheels being rotatably attached to said trailer wherein each of said wheels is configured to roll along ground when said trailer is being towed;
- a pair of charging units, each of said charging units being integrated into a respective one of said wheels such that each of said charging units rotates when said respective wheel rotates wherein each of said charging units is configured to generate electricity when said trailer is being towed thereby facilitating each of said charging units to charge the electric bicycle; and
- a braking system being integrated into said trailer, said braking system having a communication port wherein said communication port is configured to be placed in communication with a braking apparatus of the electric bicycle, said braking system being actuated into a braking condition when said communication port receives a braking command wherein said braking system on said trailer is configured to be actuated when the braking apparatus on the electric bicycle is actuated thereby assisting with slowing and stopping.

2. The assembly according to claim 1, wherein:

said trailer has a lower wall and a perimeter wall extending upwardly from said lower wall;

said trailer has a pair of wheel brackets each extending laterally away from a respective one of a first lateral side and a second lateral side of said perimeter wall, each of said wheel brackets being aligned with said lower wall, each of said wheel brackets including an outer member being spaced from and being oriented parallel with said respective first lateral side and said second lateral side of said perimeter wall; and each of said wheel brackets includes a pair of wheel mounts each extending downwardly from said outer member, each of said wheel mounts having a channel extending inwardly on a rear edge of a respective wheel mount which curves upwardly toward said outer member such that said channel in each of said wheel mounts has a J-shape.

3. The assembly according to claim 1, wherein:

said trailer has a perimeter wall, said perimeter wall having a plurality of corner posts;

said assembly includes a plurality of stabilizers, each of said stabilizers being slidably integrated into said trailer, each of said plurality of stabilizers being deployable to extending downwardly from said trailer wherein each of said plurality of stabilizers is configured to abut the ground for stabilizing said trailer;

each of said plurality of stabilizers extends into a bottom end of a respective one of said plurality of corner posts of said perimeter wall of said trailer;

each of said plurality of stabilizers having a lock which releasably engages a respective one of a plurality of engagement points integrated into said respective corner post for retaining said plurality of stabilizers at a selected length of extension; and each of said plurality of stabilizers having a foot wherein said foot on each of said plurality of stabilizers is configured to abut the ground.

4. The assembly according to claim 2, wherein each of said charging units comprises:

an axle extending through a hub of said respective wheel, said axle having a first end and a second end, said axle extending into said channel in each of said wheel mounts associated with a respective one of said wheel brackets having said axle resting against a terminal end of said channel in each of said wheel mounts such that said respective wheel is positioned between said outer member of said respective wheel bracket and said perimeter wall of said trailer;

a pair of nuts, each of said nuts being threadable onto a respective one of said first end and said second end of said axle for tightening against a respective one of said wheel mounts thereby attaching said axle to said wheel mounts; and a bearing being positioned around said axle, said bearing engaging said hub of said respective wheel thereby enhancing rotation of said wheel around said axle, said bearing being centrally positioned between said first end and said second end of said axle.

5. The assembly according to claim 4, wherein each of said charging units includes a pair of bowls, each of said bowls having an outer wall and a perimeter wall extending away from said outer wall, said axle extending through said outer wall of each of said bowls, each of said pair of bowls being oriented on said axle such that said a distal edge of said perimeter wall of each of said bowls is directed toward said wheel.

6. The assembly according to claim 5, wherein each of said charging units includes a pair of generators, each of said generators being positioned inside a respective one of said bowls.

7. The assembly according to claim 6, wherein:

each of said generators includes a winding section and a magnet section;

said winding section of each of said generators is attached to said perimeter wall of said respective bowl having said axle extending through said winding section of each of said generators; and said magnet section each of said generators is attached to said wheel such that said magnet section of each of generators is rotated around said winding section of a respective generator when said wheel rotates wherein each of said generators is configured to generate electrical energy when said respective wheel rotates.

8. The assembly according to claim 6, wherein each of said charging units includes a rechargeable battery being secured to said trailer, said rechargeable battery having an input and an output, said input being electrically coupled to each of said pair of generators such that said pair of generators charges said rechargeable battery wherein said rechargeable battery is configured to be charged when said trailer is being towed.

9. The assembly according to claim 8, wherein said pair of charging units includes a conductor being electrically coupled to said output of said rechargeable battery associated with each of said charging units, said conductor being routed along said gooseneck hitch such that a connector on said conductor is positioned adjacent to a coupling point on said gooseneck hitch wherein said connector is configured to be electrically coupled to a charging port on the electric bicycle thereby facilitating said rechargeable battery to charge the electric bicycle.

10. The assembly according to claim 2, wherein said braking system includes a pair of brakes each being associated with a respective one of said wheels, each of said brakes comprising:

a brake caliper being attached to a respective one of said wheel brackets, said brake caliper having a pair of grips each extending beyond said respective wheel, said pair of grips being urged toward each other when said brake caliper is actuated, each of said grips compressing against said respective wheel when said brake caliper is actuated for slowing a rotating of said wheel; and a brake cable being in communication with said brake caliper, said brake cable being routed along said gooseneck hitch, said brake cable having a communication port being positioned adjacent said coupling point on said gooseneck trailer wherein said communication port on said brake cable is configured to be coupled to a brake cable of the braking apparatus on the electric bicycle.

11. An electric bicycle charger assembly for generating electricity while being towed by an electric bicycle, said assembly comprising:

a trailer having a gooseneck hitch wherein said gooseneck hitch is configured to be attached to a seat post of the electric bicycle thereby facilitating the electric bicycle to tow said trailer, said trailer having a lower wall and a perimeter wall extending upwardly from said lower wall, said trailer having a pair of wheel brackets each extending laterally away from a respective one of a first lateral side and a second lateral side of said perimeter wall, each of said wheel brackets being aligned with said lower wall, each of said wheel brackets including an outer member being spaced from and being oriented parallel with said respective first lateral side and said second lateral side of said perimeter wall, each of said wheel brackets including a pair of wheel mounts each extending downwardly from said outer member, each of said wheel mounts having a channel extending inwardly on a rear edge of a respective wheel mount which curves upwardly toward said outer member such that said channel in each of said wheel mounts has a J-shape;

a plurality of stabilizers, each of said stabilizers being slidably integrated into said trailer, each of said plurality of stabilizers being deployable to extending downwardly from said trailer wherein each of said plurality of stabilizers is configured to abut the ground for stabilizing said trailer, each of said plurality of stabilizers extending into a bottom end of a respective one of a plurality of corner posts of said perimeter wall of said trailer, each of said plurality of stabilizers having a lock which releasably engages a respective one of a plurality of engagement points integrated into said respective corner post for retaining said plurality of stabilizers at a selected length of extension, each of said plurality of stabilizers having a foot wherein said foot on each of said plurality of stabilizers is configured to abut the ground;

a pair of wheels, each of said wheels being rotatably attached to said trailer wherein each of said wheels is configured to roll along ground when said trailer is being towed;

a pair of charging units, each of said charging units being integrated into a respective one of said wheels such that each of said charging units rotates when said respective wheel rotates wherein each of said charging units is configured to generate electricity when said trailer is being towed thereby facilitating said pair of charging units to charge the electric bicycle, each of said charging units comprising:

an axle extending through a hub of said respective wheel, said axle having a first end and a second end, said axle extending into said channel in each of said wheel mounts associated with a respective one of said wheel brackets having said axle resting against a terminal end of said channel in each of said wheel mounts such that said respective wheel is positioned between said outer member of said respective wheel bracket and said perimeter wall of said trailer;

a pair of nuts, each of said nuts being threadable onto a respective one of said first end and said second end of said axle for tightening against a respective one of said wheel mounts thereby attaching said axle to said wheel mounts;

a bearing being positioned around said axle, said bearing engaging said hub of said respective wheel thereby enhancing rotation of said wheel around said axle, said bearing being centrally positioned between said first end and said second end of said axle;

a pair of bowls, each of said bowls having an outer wall and a perimeter wall extending away from said outer wall, said axle extending through said outer wall of each of said bowls, each of said pair of bowls being oriented on said axle such that said a distal edge of said perimeter wall of each of said bowls is directed toward said wheel;

a pair of generators, each of said generators being positioned inside a respective one of said bowls, each of said generators including a winding section and a magnet section, said winding section of each of said generators being attached to said perimeter wall of said respective bowl having said axle extending through said winding section of each of said generators, said magnet section each of said generators being attached to said wheel such that said magnet section of each of generators is rotated around said winding section of a respective generator when said wheel rotates wherein each of said generators is configured to generate electrical energy when said respective wheel rotates;

a rechargeable battery being secured to said trailer, said rechargeable battery having an input and an output, said input being electrically coupled to each of said pair of generators such that said pair of generators charges said rechargeable battery wherein said rechargeable battery is configured to be charged when said trailer is being towed; and a conductor being electrically coupled to said output of said rechargeable battery associated with each of said charging units, said conductor being routed along said gooseneck hitch such that a connector on said conductor is positioned adjacent to a coupling point on said gooseneck hitch wherein said connector is configured to be electrically coupled to a charging port on the electric bicycle thereby facilitating said rechargeable battery to charge the electric bicycle; and a braking system being integrated into said trailer, said braking system having a communication port wherein said communication port is configured to be placed in communication with a braking apparatus of the electric bicycle, said braking system being actuated into a braking condition when said communication port receives a braking command wherein said braking system on said trailer is configured to be actuated when the braking apparatus on the electric bicycle is actuated thereby assisting with slowing and stopping, said braking system including a pair of brakes each being associated with a respective one of said wheels, each of said brakes comprising:

a brake caliper being attached to a respective one of said wheel brackets, said brake caliper having a pair of grips each extending beyond said respective wheel, said pair of grips being urged toward each other when said brake caliper is actuated, each of said grips compressing against said respective wheel when said brake caliper is actuated for slowing a rotating of said wheel; and a brake cable being in communication with said brake caliper, said brake cable being routed along said gooseneck hitch, said brake cable having a communication port being positioned adjacent said coupling point on said gooseneck trailer wherein said communication port on said brake cable is configured to be coupled to a brake cable of the braking apparatus on the electric bicycle.

12. The assembly according to claim 11, further comprising a modular pole comprising plurality of attachable sections, a lowermost one of said attachable sections tapering to a point wherein said lowermost attachable section is configured to penetrate the ground having said modular pole being vertically oriented.

13. The assembly according to claim 12, further comprising a generator bracket having a pair of coupling points and a generator cradle, each of said coupling points pivotally engaging a topmost one of said attachable sections of said modular pole, a respective one of said charging units being attachable to said generator cradle, said generator bracket being elevated when said pole is vertically oriented wherein said respective charging unit is configured to be exposed to wind.

14. The assembly according to claim 13, further comprising a plurality of fan blades, each of said plurality of fan blades being attachable to said respective charging unit wherein each of said plurality of fan blades is configured to be exposed to wind thereby facilitating said plurality of fan blades to rotate said respective charging unit for converting wind energy into electrical energy.

15. The assembly according to claim 13, further comprising a rechargeable battery being disposed on said topmost attachable section of said pole, said rechargeable battery associated with said pole being electrically coupled to said generator bracket wherein said rechargeable battery associated with said pole is configured to be charged with wind energy.

16. The assembly according to claim 12, further comprising a plurality of tie down loops, each of said plurality of tie down loops being attached to a respective one of said attachable sections of said pole thereby facilitating each of said plurality of tie down loops to be attached to a tie down line for retaining said pole in a vertical orientation.

17. The assembly according to claim 11, wherein said lower wall of said trailer has a pair of wheel openings each extending through said lower wall, each of said wheel openings being positioned adjacent to a respective one of said wheel brackets.

18. The assembly according to claim 17, further comprising:

an additional pair of wheels, each of said additional pair of wheels being positioned in a respective one of said wheel openings in said lower wall of said trailer; and an additional pair of charging units, each of said additional pair of charging units being integrated into a respective one of said additional pair of wheels, each of said pair of additional charging units being electrically coupled to a respective one of said rechargeable batteries.

19. The assembly according to claim 18, wherein said braking system on said trailer includes an additional pair of brakes each being associated with a respective one of said additional pair of wheels.

* * * * *